United States Patent [19]
Morton

[11] 4,243,709
[45] Jan. 6, 1981

[54] CAMOUFLAGE

[75] Inventor: Kenneth I. Morton, DeLand, Fla.

[73] Assignee: Brunswick Corporation, Skokie, Ill.

[21] Appl. No.: 920,958

[22] Filed: Jun. 30, 1978

Related U.S. Application Data

[63] Continuation of Ser. No. 734,531, Oct. 21, 1976, abandoned.

[51] Int. Cl.² .......................... B32B 3/10; B05D 1/36; B05D 3/02
[52] U.S. Cl. ........................... 428/195; 156/61; 156/231; 427/258; 427/385.5; 427/412.1; 428/17; 428/58; 428/202; 428/919
[58] Field of Search .................... 427/258, 407 C, 402; 428/17, 58, 195, 202, 9.9; 156/61

[56] References Cited
U.S. PATENT DOCUMENTS

| | | | |
|---|---|---|---|
| 2,455,777 | 12/1948 | Jones | 428/407 X |
| 2,486,258 | 10/1949 | Chavannes | 428/202 X |
| 2,587,594 | 3/1952 | Chavannes et al. | 156/231 |
| 3,069,796 | 12/1962 | Ruter | 428/17 |
| 3,152,002 | 10/1964 | Wisotzky et al. | 428/202 X |
| 3,463,651 | 8/1969 | Warsager et al. | 428/138 X |
| 3,961,121 | 6/1976 | Warsager et al. | 428/200 |
| 3,967,026 | 6/1976 | Dalblom | 428/195 |
| 3,977,927 | 8/1976 | Amos et al. | 156/161 |
| 4,001,827 | 1/1977 | Wallin et al. | 428/919 X |

FOREIGN PATENT DOCUMENTS

1134616  8/1962  Fed. Rep. of Germany ....... 428/9.9 X

*Primary Examiner*—George F. Lesmes
*Assistant Examiner*—R. Eugene Varndell, Jr.
*Attorney, Agent, or Firm*—John L. Isaac; Wm. Lawler

[57] ABSTRACT

Disclosed is a method for making camouflage from sheets of multi-colored coated fabric. The coated fabric is formed by sandwiching the base fabric between two films of fused polyvinyl chloride film; the two films are tightly bonded to the base fabric. Each film is formed by applying the different-colored plastisols to preselected portions of a carrier web, and then overcoating these colored portions of the web and any uncoated portions of the web with a plastisol of another color. After each of the two multi-colored films is created, they are bonded to the base fabric while the films are still attached to the carrier web; then each carrier web is stripped from the outsides of the finished multi-colored, coated fabric. These multi-colored coated fabrics are cut into sheets which are attached to a net to make the camouflage screen.

12 Claims, 11 Drawing Figures

DARK GREEN   LIGHT GREEN   DARK BROWN   LIGHT BROWN

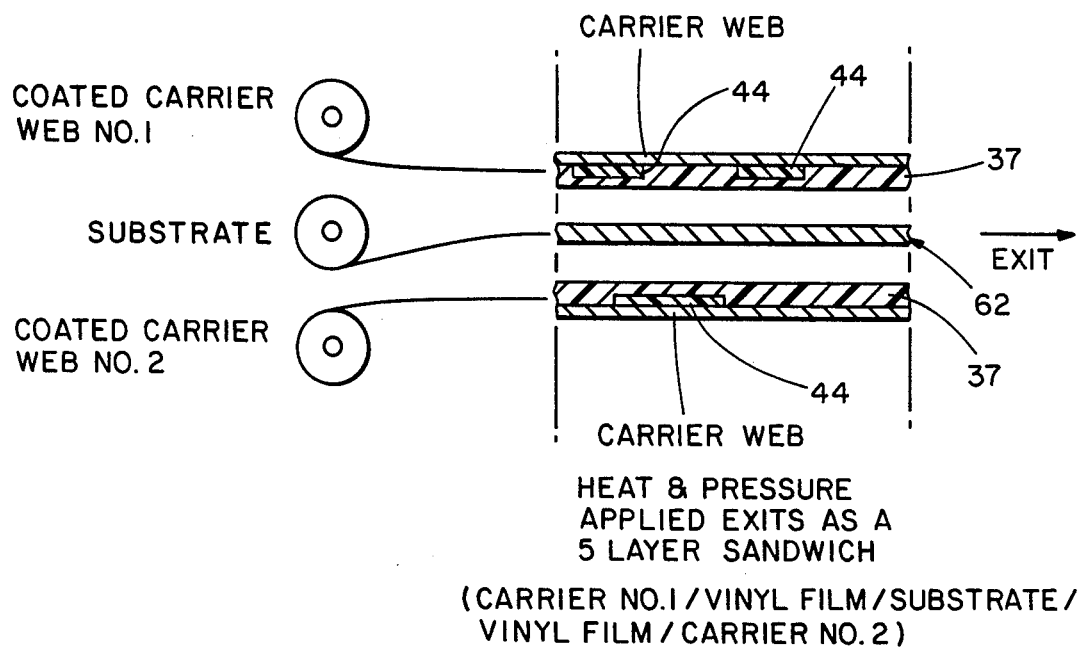
FIG. 10 (LAMINATION)
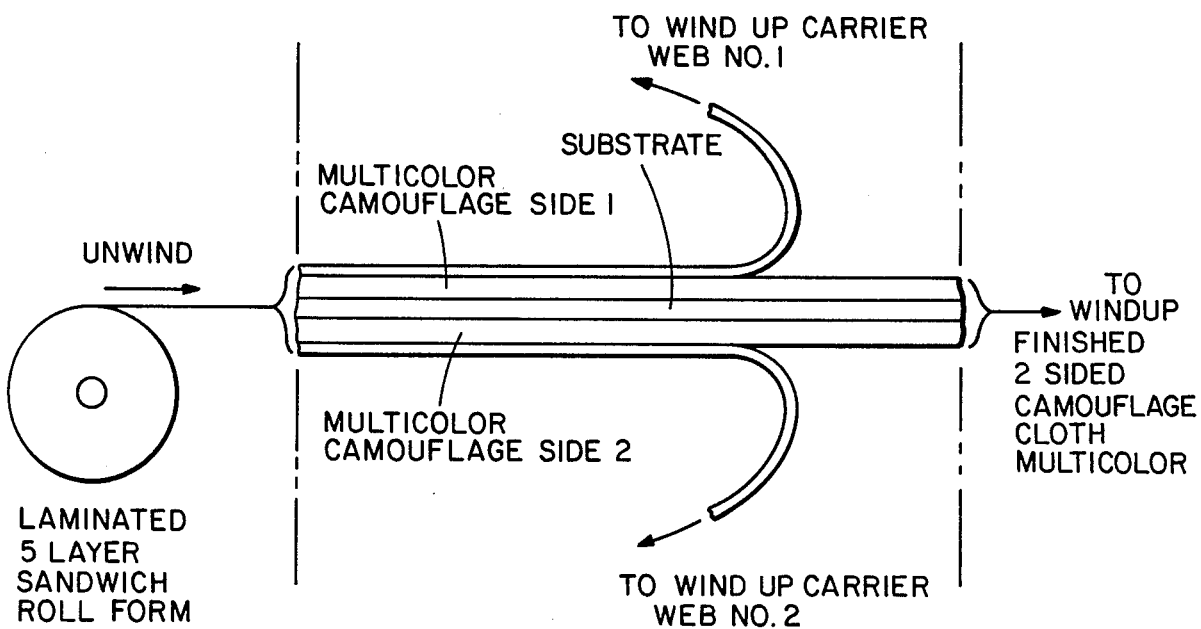
FIG. 11 (STRIPPING)

CAMOUFLAGE

This is a continuation of application Ser. No. 734,531, filed on Oct. 21, 1976, now abandoned.

BACKGROUND

Conventional methods for making camouflage require the assembly of over a hundred individual, differently shaped pieces of fabric. These pieces are attached to a net by hand using "hog rings" to secure the fabric pieces to the net. The pieces of fabric form a multicolored pattern corresponding to the mixture of colors composing the terrain in which the camouflage is to be deployed. Usually the net has different color patterns on opposite sides. For example, on one side of the net the multi-colored pattern will correspond to a summertime woodland terrain. The opposite side of the camouflage will have a multi-colored pattern corresponding to autumm woodland terrain.

U.S. Pat. application Ser. No. 540,495, now U.S. Pat. No. 3,977,927, filed Jan. 13, 1975 and entitled Machine and Method of Making Camouflage Nets, describes the equipment used to assemble the numerous pieces of fabric into camouflage. This very large equipment advances nets past a series of work stations where laborers attach the colored pieces to the net. This is a time consuming, tedious and costly job, and it would be highly desirable to provide a more efficient and economical way to make camouflage.

THE INVENTION

I have invented novel camouflage and a method for making such camouflage. The principal advantage of my invention is that my camouflage can be made using substantially less labor and the manufacturing technique does not require the use of the large equipment depicted in U.S. Ser. No. 540,495, now U.S. Pat. No. 3,977,927. Consequently, the camouflage of my invention costs substantially less to manufacture than the prior art camouflage.

According to my invention, several colored sheets are assembled into a camouflage having the desired multi-colored pattern. The sheets are attached to a net or the net is eliminated with the sheets simply joined together at their edges. The critical feature of my invention is the process by which the sheets are colored. Broadly, the process comprises applying at least two filmforming agents of different colors to the surface of a carrier web, curing the agents to form a film, and transferring and securing the film(s) to a strong substrate material.

Preferably, one or more film-forming coloring agents are applied to the carrier web so that only preselected portions of the web are covered by the agent or agents. The agent or agents are spread over the selected portions of the web to partially color the web. The web, including the partially colored portions, is then overcoated with another coloring agent which is spread over the entire surface of the web, including previous coated portions. On curing, the agents form a continuous film having a multi-colored surface adjacent the web and a solid colored surface exposed to view. This film is then bonded to a substrate, the web or webs for two-sided material are then stripped so that the multi-colored film surface(s) are exposed to view.

The types and amounts of coloring agents applied to the web are governed by the multi-colored pattern of the camouflage. The individual sheets comprising the camouflage will have different color arrangements such that on assembly of the sheets there is displayed the desired multi-colored pattern.

The typical sheet to be color coated is a spunbounded material sold by the Monsanto Corporation under the trade name CEREX. This material is light weight but strong. Preferably the CEREX sheet is treated so the camouflage will have radar scattering capability. Other base materials are also used for camouflage cloth construction. One treating method comprises applying metal fibers to the surface of the sheet. This technique is disclosed in U.S. Pat. No. 3,960,650.

The carrier web may be paper or cloth. Preferably the web is treated with a release agent such as silicone resin so that the multi-colored film can be readily stripped from the web. The web may also be treated with a delustering agent. One advantage of using a web treated with a delustering agent is that the multi-colored surface of the film upon being stripped from the web will have a generally matte finish. That is the film will not have a glossy or shiny appearance. This is highly desirable for camouflage applications.

Typical film-forming coloring agents are polyvinyl chloride plastisol compounds which form a film upon heating to temperatures in the range from about 120° to 180° C. The composition of such agents are generally well known to those skilled in the camouflage arts, and they may be purchased from many chemical coating companies. The agents are usually applied in a manner to form a film having a thickness ranging between about 2 and 3 mils.

THE DRAWINGS

FIG. 10 is an exploded view of the lamination.

FIG. 11 is a diagram with an exploded view of the stripping operation.

DETAILED DESCRIPTION OF THE INVENTION

Figure 1:
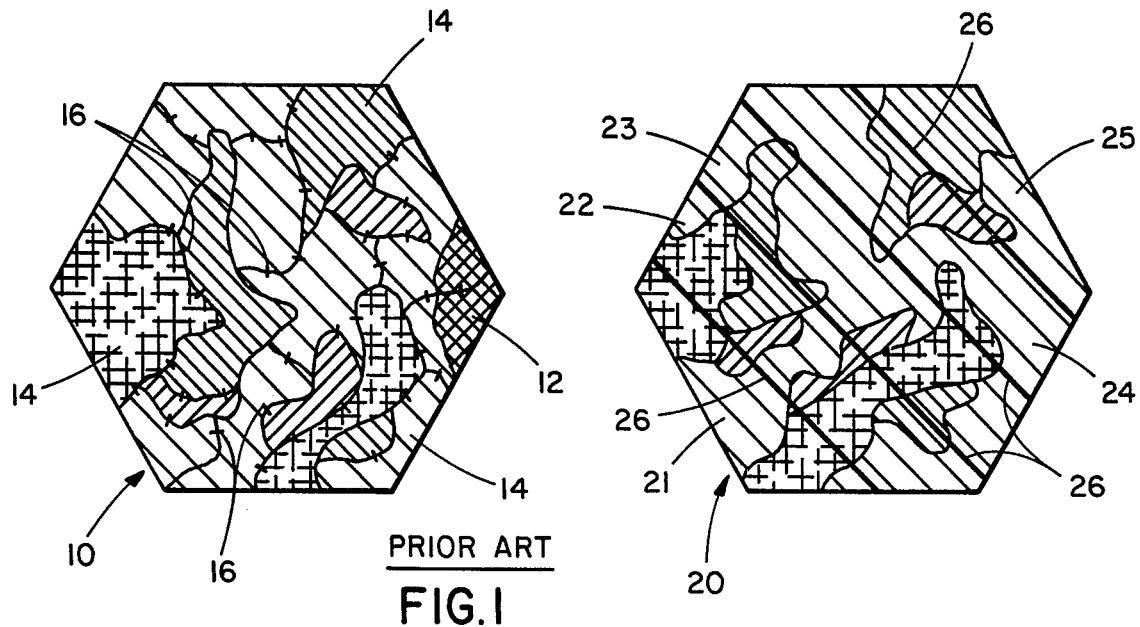
FIG. 1 is a plan view, with a section broken away, illustrating camouflage made by prior art techniques.
Figure 2:
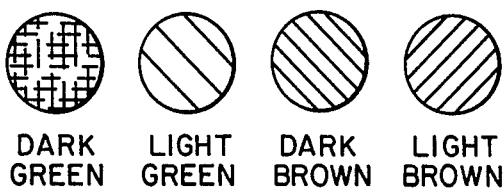
FIG. 2 is a plan view illustrating camouflage of my invention.
Figure 3:
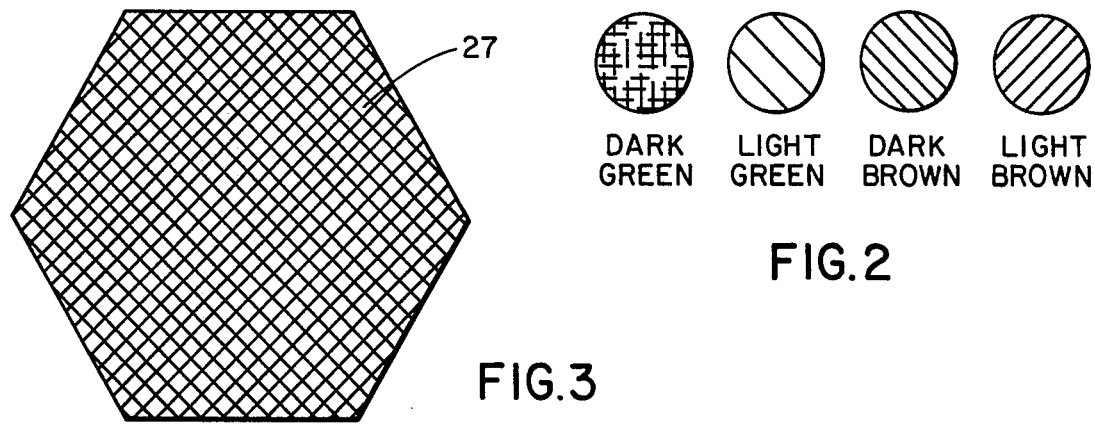
FIG. 3 is the hexagonal net to which colored sheets made by the present invention may be attached.
Figure 9:
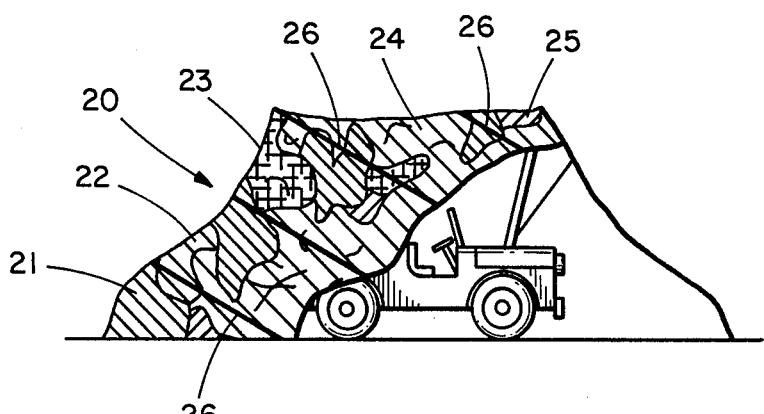
FIG. 9 is a side elevational view showing deployed camouflage of my invention.

A typical prior art camouflage 10 is schematically illustrated in FIG. 1. This camouflage 10 comprises a hexagonal net 12 such as shown in FIG. 3 and a plurality of different colored and shaped fabric pieces 14 attached to the net 12 by hog rings 16. As one can readily appreciate, to attach the numerous fabric pieces 14 to the net 12 requires a great deal of manual labor. In contrast, the camouflage 20 of my invention includes five strips 21, 22, 23, 24 and 25. The strips 21–25 are either attached at their edges 26 to each other or attached to a net 27 or both. (For clarity the edges 26 of the strips 21-25 are emphasized by a dark solid line 26. These edges 26 are not so pronounced in the actual camouflage.) These strips 21-25 when joined together form a multi-colored pattern similar to the pattern of the prior art camouflage. However, instead of employing over a 100 different colored fabric pieces 14, the multi-colored pattern is formed by the relatively few strips 21-25.

Figure 4:
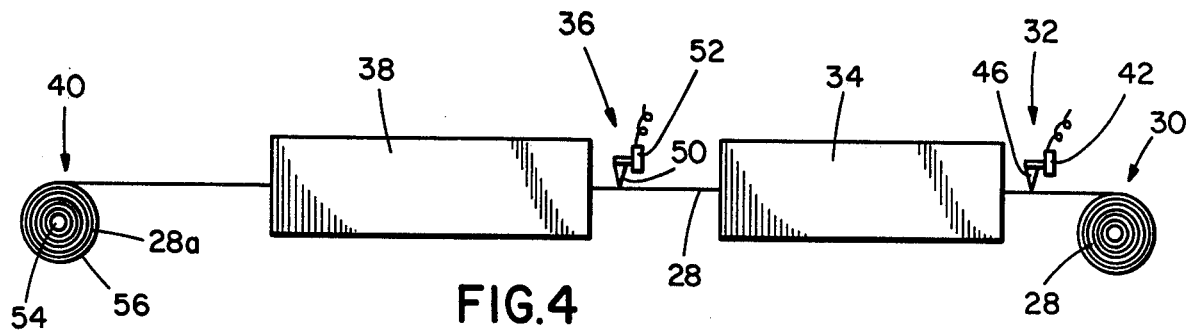
FIG. 4 is a side elevational view schematically illustrating the equipment used to apply film-forming coloring agents to the carrier web.
Figure 5:
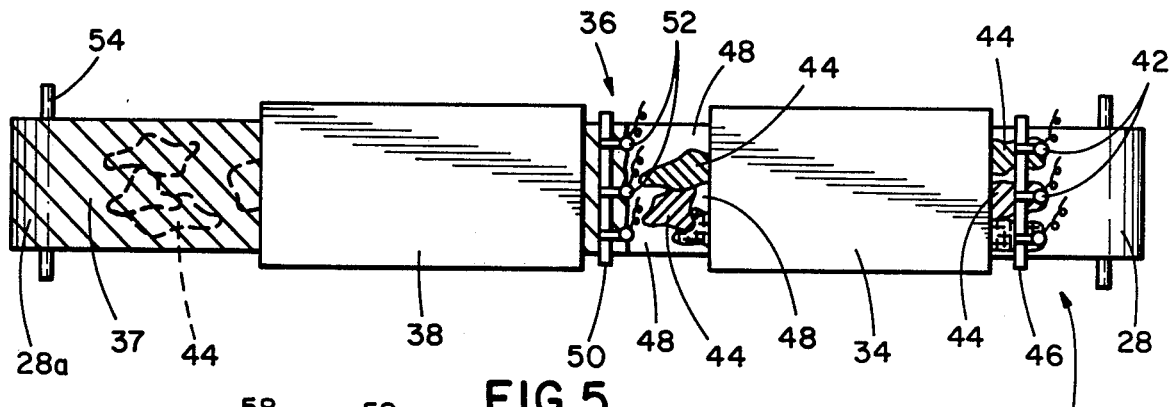
FIG. 5 is a plan view of the equipment shown in FIG. 4.

The process for making these strips 21-25 is illustrated in FIGS. 4 through 8. Referring to FIGS. 4 and 5 there is shown a roll of carrier web 28 at an unwind station 30. The web 28 moves past a first application station 32 through a first oven 34, and then to a second application station 36 and through a second oven 38 to a wind-up station 40. As the web 28 passes the first application station 32, film forming coloring agents are ejected from nozzles 42 onto the web and a doctor blade 46 spreads the agents over preselected portions 44 of the web's surface.

The coated portions 44 will generally have an irregular shape. Ordinarily this shape will vary in a somewhat uncontrolled fashion. Sufficient control, however, can be obtained by controlling the flow rate of agents through the nozzles 42 and the rate of speed of the web 28 so that the area of coverage is regulated even though the shape of the colored area varies slightly. This slightly uncontrolled variation in shape of the coated portions 44 is desirable because it creates a randomness in the multi-color pattern. Consequently, each camouflage unit will have a multi-colored pattern which is slightly different than any other unit. Since any section of natural terrain is different than any other section of terrain, the multi-colored pattern of my camouflage is like natural terrain not only in color but also randomness.

On passing the first application station 32 the web 28 moves through the oven 34 which heats the coloring agents 32 so that they cure and form a film. On exiting the oven 34 the partially coated web 28 passes by the second application station 36. Here a coloring agent having a color different than the coloring agents previously applied to the web 28 is applied to the web as an overcoating 37. A doctor blade 50 at the second application station distributes the coloring agent ejected from nozzles 52 uniformly over the surface of the web, covering the entire web surface including the previously coated portions 44. The web then advances through the second overn 38 which cures the last applied coloring agent. The coated web 28a is then rolled up on the spindle 54 at the wind-up station 40. This coated web 28a bears on its surface a film 58 comprising the portions 44 and the overcoating 37. The side 58a of the film 58 adjacent the surface of the web 28 is multi-colored and the opposite side 58b is a solid color.

Figures 6, 7:
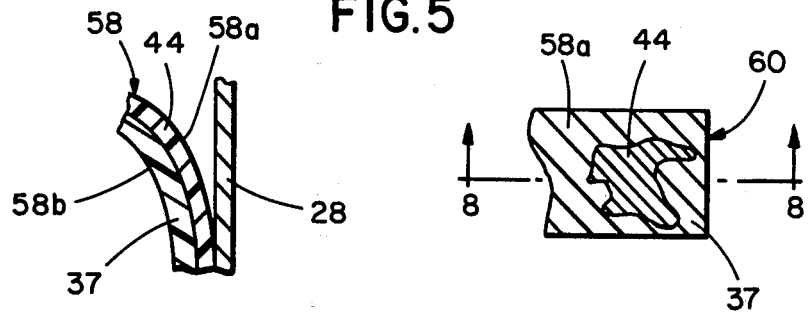
FIG. 6 is a cross-sectional view showing the multi-colored film being removed from the carrier web.
FIG. 7 is a plan view of a sheet coated with the multi-colored film shown in FIG. 6.
Figure 8:
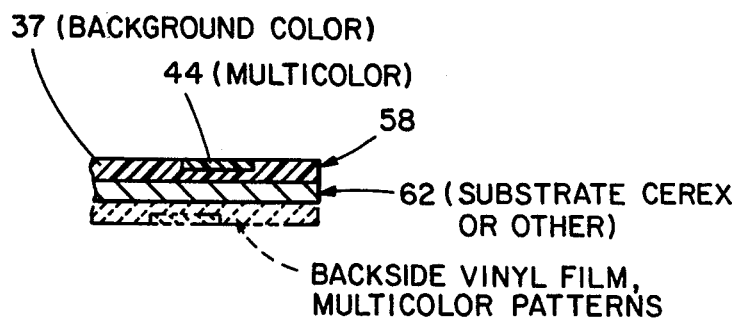
FIG. 8 is a cross-sectional view of the sheet shown in FIG. 7 taken along line 8—8.

The multi-color sheet 60 shown in FIGS. 7 and 8 is formed by laminating the films (or films for two sided camouflage) to a substrate 62, so that side 58a of the film(s) is exposed to view of the final product.

This film transfer is achieved in a two step process. Step No. 1, FIG. 10, is the lamination process where the film(s) is applied to the substrate material 62 by simultaneously passing the coated carrier web(s) and the substrate material through an oven and nip rolls. The film(s) softens slightly and adheres to the surface of this substrate 62 on cooling, and a strong bond is thereby formed between the film and substrate.

Step No. 2 is the stripping process and is illustrated in FIG. 11. In this step the carrier web(s) is stripped from the laminated sandwich, and stripping of the carrier results in the end product camouflage material with multi-color patterns exposed to view.

The sheet 60 may be incised such as disclosed in U.S. Pat. No. 3,069,796. Thus, when the camouflage 20 employing such incised sheets 21-25 is deployed as shown in FIG. 8, portions of the sheets will extend outwards from the planes of the sheets, providing a three-dimensional effect. The deployed camouflage will then give the appearance of a leafy structure corresponding to woodland terrain.

I claim:

1. A process for preparing a camouflage sheet having a multi-colored surface, comprising the steps of
   (a) randomly applying one or more colored plastisol agents in unpredictably irregular shaped patches to a substantially flat surface of a carrier web so that only randomly preselected portions of said web surface are covered by the agents,
   (b) overcoating the previously colored patches of said web surface and any uncoated portions of the web with a colored plastisol agent having a color different than the color of the one or more plastisol agents previously applied to the web,
   (c) forming the agents into a film characterized by a top surface having a single color and a bottom surface immediately adjacent the web which is substantially flat and has a randomly distinct, irregular and non-repetitive multi-colored pattern, and
   (d) transferring and securing the film to the sheet to be colored so that the single color film surface abuts the sheet surface and the multi-colored pattern is exposed to view.

2. The process of claim 1 wherein the plastisol agents are formed into a film by heating.

3. A camouflage comprising an assembly of strips having a colored surface corresponding to the color of the terrain in which the camouflage is to be deployed, said strips being made by a process wherein a continuous multi-colored film having a randomly distinct, irregular and non-repetitive pattern is formed on a carrier web by sequentially applying at least two film-forming plastisol agents of different colors to the surface of the carrier web, the first of said agents being applied in a plurality of unpredictably irregular-shaped patches on the carrier, and the second of said agents being applied to cover the patches of the first applied agent and the remaining portion of the carrier not covered by the patches of the first applied agent, heat curing the agents to form the multi-colored film, and transferring and securing the film to a base sheet to form said strips.

4. The invention of claim 3 where the patches of the second colored film lie flush with the top face of the first colored film.

5. The invention of claim 4 where the top face of the first colored film and the surface of the patches of second colored film that is flush with the top face of the first colored film have a generally matte finish.

6. Camouflage comprising an assembly of strips of colored sheet material joined together to form a randomly distinct, irregular and non-repetitive multi-colored pattern, said strips being made by a process wherein a first film-forming plastisol coloring agent is applied in unpredictably irregular-shaped patches to a carrier web so that only preselected random portions of the web are covered by the agent, the previously covered portion of the web and any uncoated portions of the web are over-coated with a second film-forming plastisol coloring agent having a color different than the color of the agent previously applied to the web, said agents forming into a film characterized by a top surface having the color of the second agent and a bottom surface immediately adjacent to the web having the randomly distinct, irregular and non-repetitive color pattern of both of said agents, and said colored sheet material being colored by transferring and securing the film to the sheet so that the single color film surface abuts the sheet surface and the surface having the color of both of said agents is exposed to view.

7. A camouflage sheet comprising:

a base fabric;

a first colored layer of plastisol film bonded to one surface of said base fabric and having a top viewing surface; and at least one other plastisol film randomly arranged in unpredictably irregular-shaped patches in said plastisol layer and having a color different from said first colored plastisol layers, each said unpredictably irregular-shaped patch being firmly imbedded in a recess in said first colored plastisol layer in alignment with said top viewing surface to form a substantially continuous and smooth top viewing surface, said patches being randomly shaped and arranged in said first colored layer to provide a randomly distinct, irregular and non-repetitive multi-colored pattern of the top viewing surface of said sheet.

8. The invention of claim 7 where said colored plastisol films are polyvinyl chloride film.

9. The invention of claim 7 where the base farbric is a spun-bonded material.

10. The camouflage sheet as described in claim 7, wherein said sheet includes a plurality of said other plastisol films, with each said other film having a color different from said first colored plastisol film and being randomly arranged and intermixed in a plurality of said patches.

11. The camouflage sheet as described in claim 7, wherein said base fabric includes a top and bottom surface and said first colored plastisol film is bonded to said top surface, and wherein said sheet further includes a second colored layer of plastisol film bonded to the bottom surface of said base fabric, said second colored layer having a bottom viewing surface, and at least one other plastisol film randomly arranged in unpredictably irregular-shaped patches in said second colored plastisol layer and having a color different from said second colored plastisol layer, each said unpredictably irregular-shaped patch of said other plastisol film in said second colored layer being firmly imbedded in a recess in said second colored plastisol layer in alignment with said bottom viewing surface and randomly shaped and arranged in said second colored layer to provide a randomly distinct, irregular and non-repetitive multi-colored pattern on the bottom viewing surface of said sheet.

12. A camouflage assembly for concealing an article in natural terrain comprising a plurality of elongated, substantially parallel camouflage sheets having side edges joined together to form a single assembly, each said sheet having a randomly distinct, irregular and non-repetitive multi-colored pattern thereon and comprising a base fabric, a first colored layer of plastisol film bonded to one surface of said base fabric and having a top viewing surface, and at least one other plastisol film randomly arranged in unpredictably irregular-shaped patches in said plastisol layer and having a color different from said first colored plastisol layer, each said unpredictably irregular-shaped patch being firmly imbedded in a recess in said first colored plastisol layer in alignment with said top viewing surface to form a substantially continuous and smooth top viewing surface, said patches being randomly shaped and arranged in said first colored layer to provide a random, irregular and non-repetitive multi-colored pattern on the top surface of each said sheet which is nonuniformly distinct from the random, irregular and non-repetitive multi-colored pattern of the other sheets of said assembly.

* * * * *